(12) United States Patent
Shirooni et al.

(10) Patent No.: US 8,776,530 B2
(45) Date of Patent: Jul. 15, 2014

(54) GAS TURBINE ENGINE LOCKOUT REDUCTION

(75) Inventors: Steve Shirooni, Cincinnati, OH (US); Mohamed Ahmed Ali, Mason, OH (US); Mark Brands, West Chester, OH (US); John Edward Altman, Cincinnati, OH (US); Abdus Shamim, West Chester, OH (US)

(73) Assignee: General Electric Company, Schenectady, NY (US)

( * ) Notice: Subject to any disclaimer, the term of this patent is extended or adjusted under 35 U.S.C. 154(b) by 70 days.

(21) Appl. No.: 13/303,338

(22) Filed: Nov. 23, 2011

(65) Prior Publication Data
US 2013/0125552 A1    May 23, 2013

(51) Int. Cl.
*F02K 7/08*    (2006.01)
*F02G 3/00*    (2006.01)

(52) U.S. Cl.
USPC .......................................... 60/779; 60/39.091

(58) Field of Classification Search
USPC ................... 60/772, 773, 776, 778, 779, 726, 60/39.091
See application file for complete search history.

(56) References Cited

U.S. PATENT DOCUMENTS

| 2,684,568 | A | * | 7/1954 | Senger | ............................ | 415/14 |
| 4,003,200 | A |   | 1/1977 | Zerlauth | | |
| 4,482,293 | A | * | 11/1984 | Perry | ............................... | 415/14 |
| 2010/0189551 | A1 | * | 7/2010 | Ballard et al. | ................. | 415/175 |

FOREIGN PATENT DOCUMENTS

GB    2117842    10/1983

* cited by examiner

*Primary Examiner* — Gerald L Sung
*Assistant Examiner* — Scott Walthour
(74) *Attorney, Agent, or Firm* — William Scott Andes; Trego, Hines & Ladenheim, PLLC

(57) ABSTRACT

A method is provided of reducing lockout time of a gas turbine engine which includes: an inlet, a compressor, a combustor, a turbine, and an exhaust duct, where the compressor and the turbine are carried on a turbomachinery rotor and each include an array of blades mounted for rotation inside a casing of the engine. The method includes: operating the engine at a first power output; shutting down operation of the engine without substantially reducing the power output beforehand, wherein thermomechanical changes occur in the engine subsequent to shutdown that tend to reduce a radial clearance between at least one of the blades and the casing; and subsequent to shutting down the engine, (1) heating the casing and/or (2) pumping an airflow of ambient air into the inlet and through the casing, past the rotor, and out the exhaust duct, so as to reverse at least partially the thermomechanical changes.

14 Claims, 5 Drawing Sheets

GAS TURBINE ENGINE LOCKOUT REDUCTION

BACKGROUND OF THE INVENTION

This invention relates generally to gas turbine engines and more particularly to methods for operating such engines during a shutdown period.

A gas turbine engine includes a turbomachinery core having a high pressure compressor, a combustor, and a high pressure or gas generator turbine in serial flow relationship. The core is operable in a known manner to generate a primary gas flow. In a turboshaft engine, another turbine disposed downstream of the core (referred to as a low pressure, "work", or "power" turbine) extracts energy from the primary flow to drive a shaft or other mechanical load. One common use is to couple the gas turbine engine to an external load such as a pump, compressor, or electrical generator.

For efficient operation, the turbomachinery in a gas turbine engine depends on maintaining small but definite radial clearances between the tips of the rotating blades and the stationary annular casing that surrounds them. The casing is generally more "thermally responsive" than the rotor, i.e. it generally expands or contracts at a greater rate than the rotor during a change in engine power output, and the associated temperature change. As a result the blade clearances tend to open or close during changes in engine power output. For this reason, gas turbine engines are generally shut down by gradually reducing the output power level, so that the radial clearances can stabilize.

However, operational reasons can require that the external load be removed and that the engine be shut down immediately, without being able to gradually reduce power. This is referred to as a "hot shutdown". When a hot shutdown occurs, the engine components cool rapidly. In general the casing cools down faster than the rotor, causing the case to compress against the rotor blades and close the airflow clearances in the compressor. Also, once the engine stops rotating natural convection patterns cause the upper portions of the rotor to heat up and expand more than the lower portions. This causes bending or bowing of the rotor that further reduces radial clearances at specific locations. The combined effect of case shrinkage and rotor bowing cause the rotor to become "locked", a condition in which the rotor and casing actually contact each other.

When the engine experiences a hot shutdown, the engine must be restarted or undergo a hot crank within a short time after the shutdown (for example about 10 minutes) in order to prevent the rotor from locking up. If the rotor locks up, the engine cannot be restarted until after the passage of a "lockout period", in order to avoid rotor and casing damage. This period is undesirable for a number of reasons including the cost and physical inconvenience of not having the engine in service.

Accordingly, there is a need for a method of operating a gas turbine engine that minimizes or eliminates the lockout period after a hot shutdown.

BRIEF DESCRIPTION OF THE INVENTION

This need is addressed by the present invention, which according to one aspect provides methods for heating the casing and/or cooling the rotor of a gas turbine engine in order to reduce the lockout period.

According to one aspect of the invention, a method is provided of reducing lockout time of a gas turbine engine which includes, in serial flow communication: an inlet, a compressor, a combustor, a turbine, and an exhaust duct, where the compressor and the turbine are carried on a turbomachinery rotor and each include an array of blades mounted for rotation inside a casing of the engine. The method includes: operating the engine at a first power output level; shutting down operation of the engine without substantially reducing the power output level beforehand, wherein thermomechanical changes occur in the rotor and the casing subsequent to the shutdown that tend to reduce a radial clearance between at least one of the blades and the casing; and subsequent to shutting down the engine, heating the casing of the engine so as to expand the casing and increase a radial clearance between the blades of the rotor and the casing.

According to another aspect of the invention, a method is provided of reducing a lockout time of a gas turbine engine which includes, in serial flow communication: an inlet, a compressor, a combustor, a turbine, and an exhaust duct, where the compressor and the turbine are carried on a turbomachinery rotor and each include an array of blades mounted for rotation inside a stationary casing of the engine. The method includes: operating the engine at a selected power output level; shutting down operation of the engine without substantially reducing the power output level shutdown, wherein thermomechanical changes attributable to cooling occur in the rotor and the casing subsequent to then shutdown that tend to reduce a radial clearance between at least one of the blades and the casing, thereby resulting in a lockout condition; and subsequent to shutting down the engine, pumping an airflow of ambient air into the inlet and allowing the pumped air to flow through the casing, past the rotor, and out the exhaust duct, so as to reverse at least partially, the thermomechanical changes.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
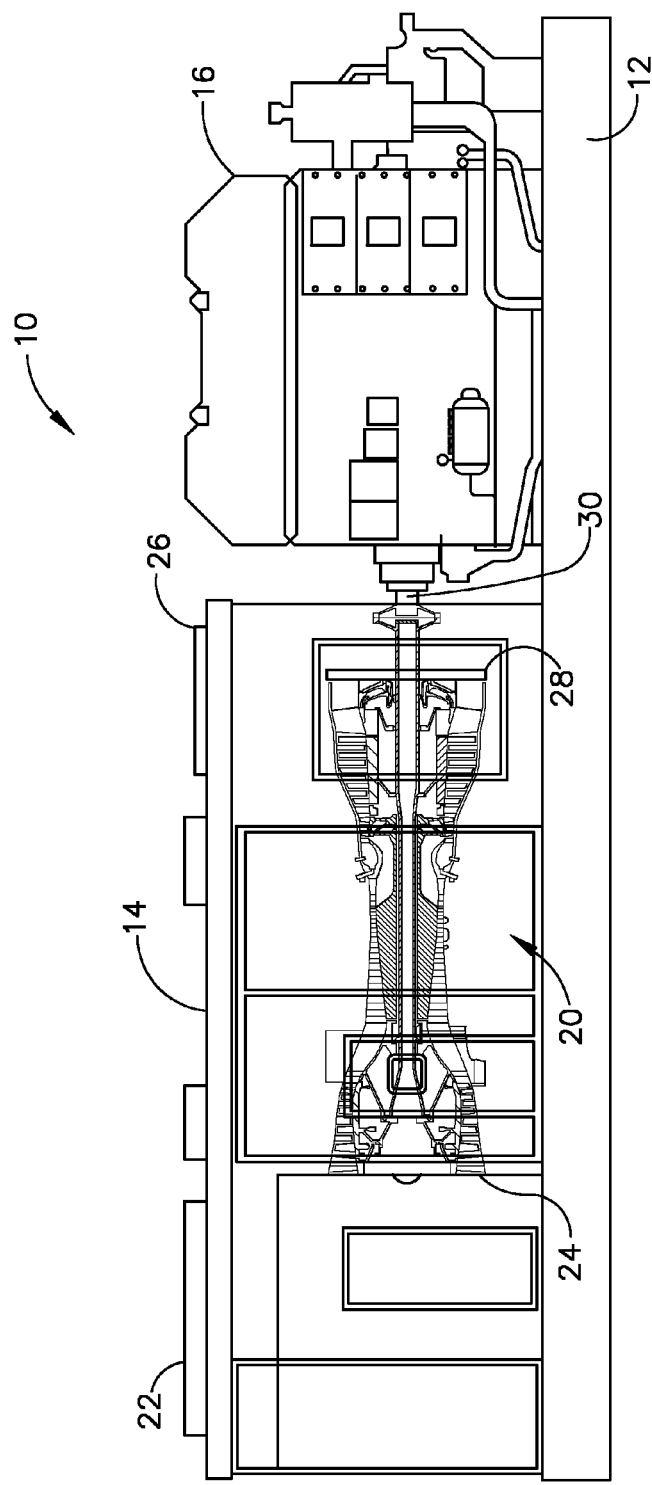
FIG. 1 is a schematic cross-sectional view of a genset module constructed in accordance with an aspect of the present invention.

Referring to the drawings wherein identical reference numerals denote the same elements throughout the various views, FIG. 1 depicts a genset module 10. It includes a base 12 upon which are mounted an engine enclosure 14 and an electrical generator 16. The electrical generator 16 is used as a representative example of an external load device. A gas turbine engine 20 (or simply "engine") is disposed inside the engine enclosure 14. The engine enclosure 14 includes a combustion air inlet 22 coupled in flow communication with an inlet 24 of the engine 20, and an exhaust gas exit 26 coupled in flow communication with an exhaust duct 28 of the engine 20. The gas turbine engine 20 is coupled by an output shaft 30 to the electrical generator 16.

Figure 2:
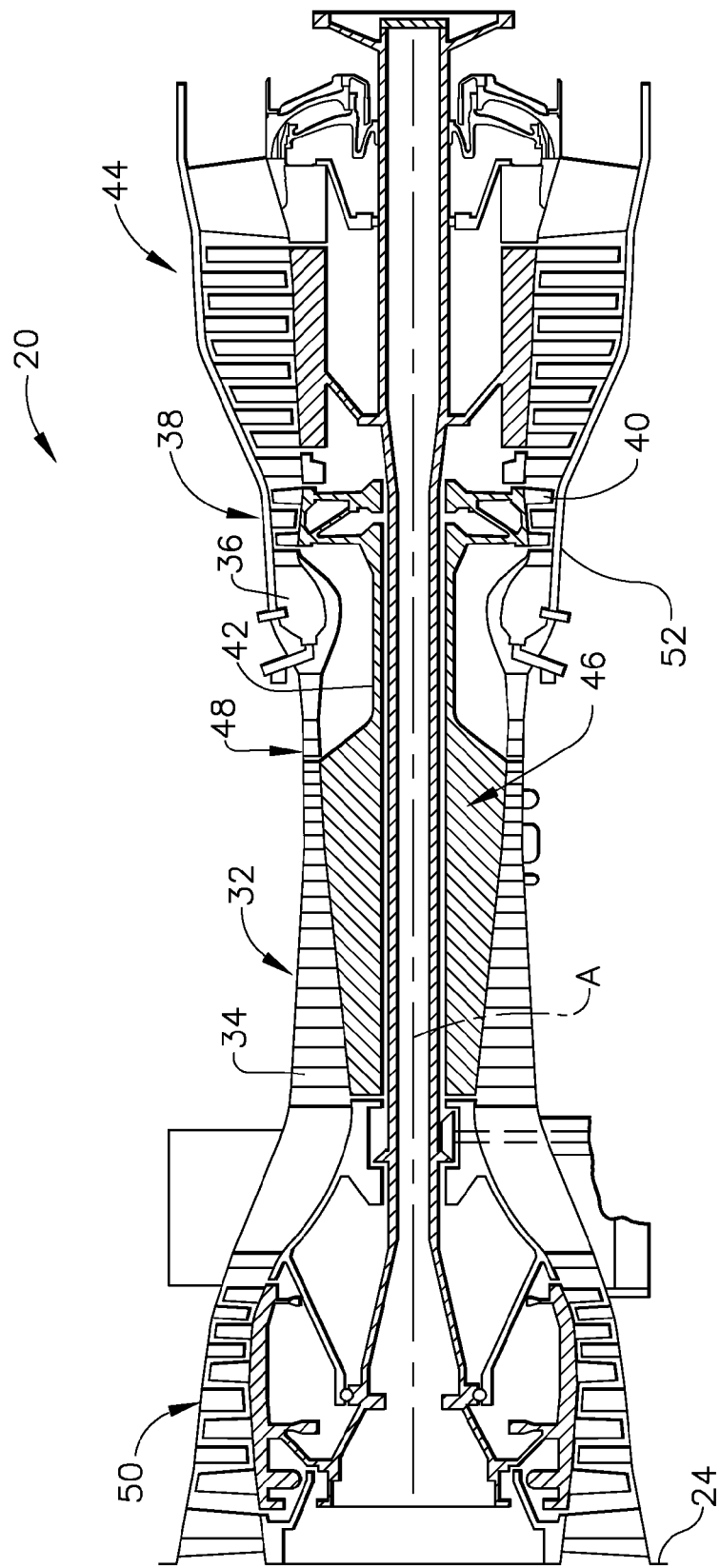
FIG. 2 is a schematic cross-sectional view of a gas turbine engine shown in FIG. 1.

Referring to FIG. 2, the engine 20 includes a high pressure compressor ("HPC") 32 carrying a number of stages of rotating compressor blades 34, a combustor 36, and a high pressure turbine ("HPT") 38 carrying a number of stages of rotating turbine blades 40. The HPC, combustor, and HPT are all arranged in a serial, axial flow relationship along a central longitudinal axis denoted by line "A". Collectively these three components are referred to as a "core". The high pressure compressor 32 provides compressed air that passes into the combustor 36 where fuel is introduced and burned, generating hot combustion gases. The hot combustion gases are discharged to the high pressure turbine 38 where they are expanded to extract energy therefrom. The high pressure turbine 38 drives the compressor 32 through a rotor shaft 42. Combustion gases exiting from the high pressure turbine 38 are discharged to a downstream power turbine 44 (also sometimes referred to as a "low pressure turbine" or "work turbine"). The power turbine 44 drives the output shaft 30 described above.

Collectively the high pressure compressor 32, the rotor shaft 42, and the high pressure turbine 38 are referred to as a "core rotor" or simply a "rotor" 46. The rotor 46 rotates within a stationary annular casing 48, which in this example includes a high pressure compressor case 50 and a compressor rear frame 52. The radial tips of the compressor blades 34 and the turbine blades 40 have defined radial clearances from the inner surface of the casing 48.

During steady-stage engine operation, the fuel flow rate to the combustor and the rotational speed (RPM) of the rotor 46 are approximately constant. As a result, the temperatures of the various components are approximately constant, along with the radial clearances between the blade tips and the casing 48. Increased engine power output implies increased RPM, fuel flow, and component temperatures, while decreased engine power output implies decreased RPM, fuel flow, and component temperatures. During changes in power output, the physical properties of the casing 48 tend to make it more thermally responsive than the rotor 46. In other words, the casing grows or shrinks in the radial direction as a faster rate than the rotor 46 in response to a temperature change. This property is of a special concern during the above-mentioned hot shutdown and will often lead to rotor lockup.

Figure 3:
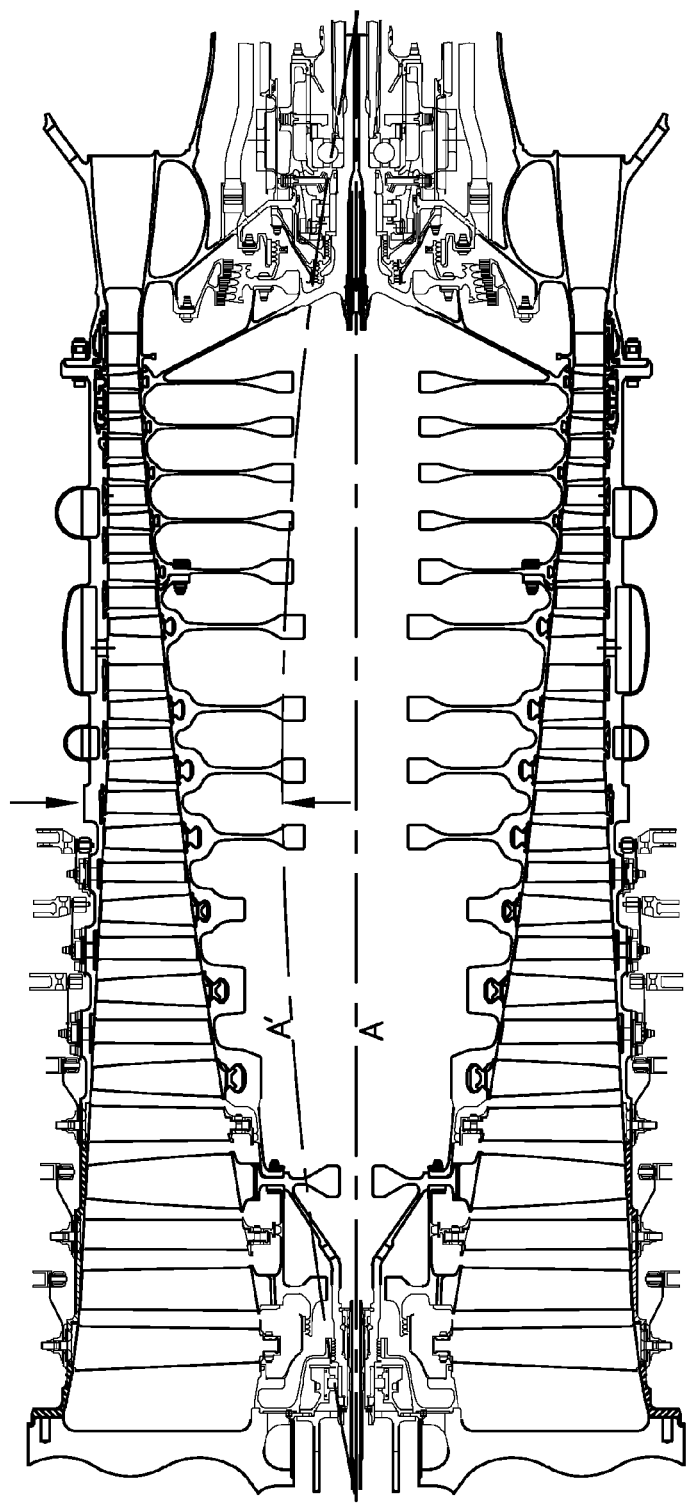
FIG. 3 is a schematic drawing illustrating bowing of the rotor of the engine shown in FIG. 2.

During engine operation, air, gas, and component temperatures within the engine 20 tend to be relatively evenly distributed around the periphery of the rotor 46. In other words, when viewed forward looking aft, temperatures at the various clock positions are approximately equal or vary within relatively narrow limits. When the engine 20 is shut down, the rotor 46 decelerates and stops rotating in a very short period of time, for example about 2-3 minutes. Once the rotor 46 stops, natural convection currents cause the upper half of the rotor 46 to heat up and expand axially more than the lower portions. As a result the rotor 46 becomes "bowed". FIG. 3 schematically illustrates this bowing, where line A represents the location of the central longitudinal axis of the rotor 46, which is nominally coaxial with the engine's central longitudinal axis, and the line "A'" represents the central axis of the bowed rotor 46. The degree of bowing is greatly exaggerated for the purposes of illustration. It can be seen that this bowing will tend to reduce the radial clearance between the rotor 46 and the casing 48 at specific axial locations along the rotor 46. Collectively the bowing and the casing shrinkage constitute thermomechanical changes in the engine 20.

Figure 4:
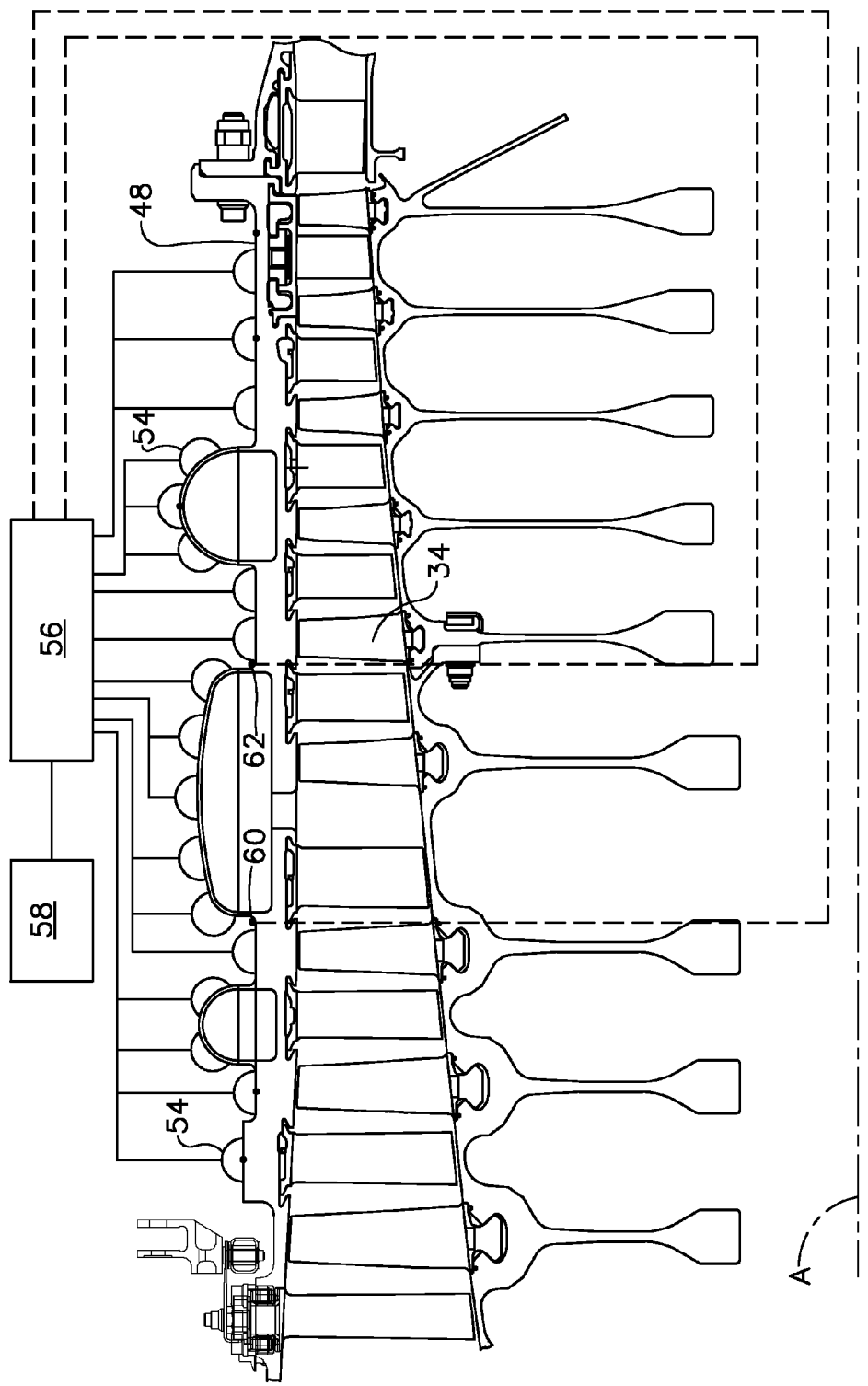
FIG. 4 is a half-sectional view of a portion of the engine shown in FIG. 2, illustrating heating elements mounted thereto.
Figure 5:
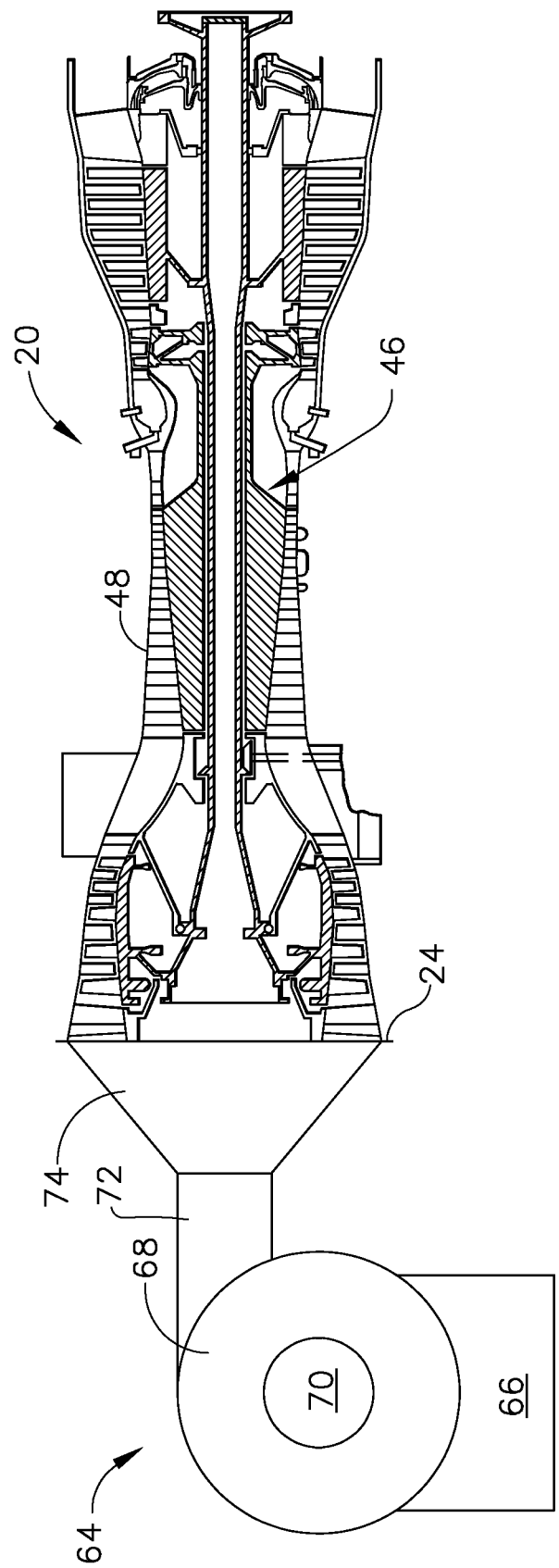
FIG. 5 is a schematic drawing illustrating a blower coupled to an inlet of the engine of FIG. 2.

The present invention provides apparatus and a method for reducing both the loss of radial clearance and the bowing. According to one aspect of the invention, means may be provided for selectively heating the casing 48 in order to expand it. For example, FIG. 4 illustrates a series of electrical resistance heating elements 54 of a known type applied to the exterior of the casing 48. Each heating element 54 is in the form of an annular ring disposed in contact with the outer surface of the casing 48. The individual heating elements 54 are connected to a controller 56, which is in turn connected to an electrical power source 58, such as a battery, generator, or electrical power grid. It is envisioned that other types of heating devices could be used in place of the resistance heating elements 54. For example, flexible heating blankets could be used instead of rigid elements. As another example, hollow tubes (not shown) could be mounted around the outer surface of the casing 48, and a heated fluid such as water, bleed air, oil, or steam could be circulated through the tubes.

The controller 56 is a device capable of selectively supplying electrical power from the power source 58 to the heating elements 54. The controller 56 could be implemented using, for example, a number of relays, or it could incorporate a programmable logic controller or a microprocessor-based general purpose microcomputer. In the illustrated example, the heating elements 54 are divided into zones that can be individually powered, with some zones containing a single heating element 54 and other zones containing multiple heating elements. The use of zoned control permits the heating rate to be tailored as needed depending on the wall thickness and component configuration at a number of locations along the casing 48.

After a hot shutdown occurs, the casing 48 (or selected portions thereof) is heated so that it expands and increases the radial clearance between the compressor blades 34 and the inner surface of the casing 48. For example, the casing 48 may be heated to a temperature in a range of about 260° C. (500° F.) to about 370° C. (700° F.). Such temperatures are not high enough to damage the materials of the casing 48, but are effective to increase the clearances substantially and thereby unlock the rotor 46 so the engine 20 can be restarted. Once the engine 20 is started, heating can be terminated. Control of the heating elements 54 could be through a simple timer implementing a fixed-duration heating cycle. Alternatively, the engine 20 could be provided with one or more strain gages 60 or similar sensors operatively coupled to the controller 56 (shown schematically in FIG. 4), and the heating cycle could be terminated when the casing 48 is expanded a predetermined amount. As another alternative, the engine 20 could be provided with one or more thermocouples 62 or similar sensors operatively coupled to the controller 56 (shown schematically in FIG. 4), and the heating cycle could be terminated when the casing 48 is heated to a predetermined temperature.

According to another aspect of the invention, means may be provided for cooling the rotor 46 after a hot shutdown. In the illustrated example, a blower 64 includes a base 66, a fan 68 (such as a centrifugal fan), and an electric motor 70 driving the fan 68. An outlet duct 72 of the fan 68 may be positioned in front of the engine inlet 24, and a divergent adapter duct 74 may be placed in-between the two. The blower 64 is arranged to discharge air in a substantially axisymmetric pattern through the engine inlet 24. The blower 64 is connected to a suitable power source such as a battery, generator, or electrical grid (not shown).

After a hot shutdown occurs, the blower 64 is positioned in front of the inlet 24 of the engine 20, and the motor 70 is started. The blower 64 forces ambient air at room temperature, for example about 15° C. (59° F.), through the casing 48 and past the rotor 46. The air flow produced by the blower 64 has a relatively high volume flow rate, for example about 28-51 m³/min. (1000-1800 ACFM), at a low pressure, for example about 3-4 kPa (12-16 in. H$_2$O). The air flow is effective to cool the rotor 46 and the casing 48 to some degree, and is also effective to break up natural convection patterns around the rotor 46. This results in the equalization of temperatures around the periphery of the rotor 46. The equalization of temperatures reverses the bowing of the rotor 46. The discharge pressure of the blower 64 is not sufficient to turn the rotor 46 in a lockup condition, but is sufficient to turn or "windmill" the rotor 46 if it is not in a lockup condition. Accordingly, the blower 64 can be controlled by monitoring the rotational speed of the rotor 46. When the rotor 46 begins to turn at a significant speed (for example a few hundred RPM), the blower 64 can be stopped and moved away from the inlet 24.

The heating and cooling techniques described above may be used in combination to reduce lockout times substantially, and potentially eliminate lockout times completely. Tests have shown that the heating or cooling techniques described above, or a combination thereof, can reduce the lockout period from hours to minutes. For, example the lockout time may be about 10 to about 30 minutes using a combination of the techniques.

Control of the combined heating and cooling techniques may be integrated. For example, after a hot shutdown, heating elements 54 and blower 64 may be started simultaneously while rotor speed is monitored. When the rotor 46 reaches a predetermined threshold speed, both heating and cooling may be terminated.

The foregoing has described a method for reducing lockout in a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A method of reducing a lockout time of a gas turbine engine which includes, in serial flow communication: an inlet, a compressor, a combustor, a turbine, and an exhaust duct, where the compressor and the turbine are carried on a turbomachinery rotor and each include an array of blades mounted for rotation inside a stationary casing of the engine, the method comprising:
   operating the engine at a first power output level;
   shutting down operation of the engine without substantially reducing the power output level prior to the shutdown, wherein thermomechanical changes attributable to cooling occur in the rotor and the casing subsequent to the shutdown that reduce a radial clearance between at least one of the blades and the casing, thereby resulting in a lockout condition wherein the rotor and casing contact each other; and
   during the lockout condition, heating the casing of the engine uniformly about its circumference so as to expand the casing and increase a radial clearance between the blades of the rotor and the casing, so as to reverse at least partially the thermomechanical changes.

2. The method of claim 1 further comprising terminating heating the casing after a predetermined time.

3. The method of claim 1 further comprising:
   determining a temperature of the casing; and
   terminating heating the casing when it reaches a predetermined temperature.

4. The method of claim 1 further comprising:
   determining a physical dimension of the casing; and
   terminating heating the casing when the dimension increases by a predetermined amount.

5. The method of claim 1 wherein the casing is heated using at least one heating element disposed in contact with an outer surface of the casing.

6. The method of claim 5 wherein a plurality of spaced-apart annular heating elements are disposed in contact with an outer surface of the casing.

7. The method of claim 6 wherein the heating elements are grouped into zones of one or more heating elements each, the zones being individually controllable.

8. The method of claim 1 further comprising:
   subsequent to shutting down the engine, pumping an airflow of ambient air into the inlet of the engine and allowing the pumped air to flow through the casing, past the rotor, and out the exhaust duct.

9. The method of claim 8 comprising: monitoring a rotational speed of the rotor and stopping heating of the casing when the rotor exceeds a predetermined rotational speed.

10. The method of claim 8 wherein the air is pumped by a blower positioned in front of the inlet and coupled to the inlet by a duct.

11. The method of claim 10 wherein the airflow is sufficient to rotate the rotor if the engine is not in a lockout condition, but is insufficient to turn the rotor if the engine is in a lockout condition.

12. A method of reducing a lockout time of a gas turbine engine which includes, in serial flow communication: an inlet, a compressor, a combustor, a turbine, and an exhaust duct, where the compressor and the turbine are carried on a turbomachinery rotor and each include an array of blades mounted for rotation inside a stationary casing of the engine, the method comprising:
   operating the engine at a selected power output level;
   shutting down operation of the engine without substantially reducing the power output level prior to the shutdown, wherein thermomechanical changes attributable to cooling occur in the rotor and the casing subsequent to the shutdown that reduce a radial clearance between at least one of the blades and the casing, thereby resulting in a lockout condition; and
   during the lockout condition, pumping an airflow of ambient air into the inlet and allowing the pumped air to flow through the casing, past the rotor, and out the exhaust duct, so as to reverse at least partially the thermomechanical changes, wherein the airflow is sufficient to rotate the rotor if the rotor is not in the lockout condition, but is insufficient to turn the rotor if the rotor is in the lockout condition.

13. The method of claim 12 wherein the air is pumped by a blower positioned in front of the inlet and coupled to the inlet by a duct.

14. The method of claim 12 comprising: monitoring a rotational speed of the rotor and stopping the airflow when the rotor exceeds a predetermined rotational speed.

* * * * *